United States Patent
Bickford et al.

(10) Patent No.: US 9,639,645 B2
(45) Date of Patent: May 2, 2017

(54) INTEGRATED CIRCUIT CHIP RELIABILITY USING RELIABILITY-OPTIMIZED FAILURE MECHANISM TARGETING

(71) Applicant: GLOBALFOUNDRIES INC., Grand Cayman (KY)

(72) Inventors: Jeanne P. Bickford, Essex Junction, VT (US); Nazmul Habib, South Burlington, VT (US); Baozhen Li, South Burlington, VT (US); Tad J. Wilder, South Hero, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 112 days.

(21) Appl. No.: 14/742,801

(22) Filed: Jun. 18, 2015

(65) Prior Publication Data

US 2016/0371413 A1 Dec. 22, 2016

(51) Int. Cl.
G06F 17/50 (2006.01)

(52) U.S. Cl.
CPC ...... *G06F 17/5045* (2013.01); *G06F 17/5081* (2013.01); *G06F 17/5068* (2013.01)

(58) Field of Classification Search
CPC ............. G06F 17/5045; G06F 17/5068; G06F 17/5081
See application file for complete search history.

(56) References Cited

U.S. PATENT DOCUMENTS

| | | |
|---|---|---|
| 6,393,602 B1 | 5/2002 | Atchison et al. |
| 6,789,032 B2 | 9/2004 | Barbour et al. |

(Continued)

FOREIGN PATENT DOCUMENTS

| | | |
|---|---|---|
| CN | 102567560 A | 7/2012 |
| JP | 2011-077287 | 4/2011 |

(Continued)

OTHER PUBLICATIONS

Hsu et al., "Hybrid Data Mining Approach for Pattern Extraction From Wafer Bin Map to Improve Yield in Semiconductor Manufacturing", ScienceDirect, International J. Production Economics, 107 (2007), pp. 88-103.

(Continued)

*Primary Examiner* — Naum B Levin
(74) *Attorney, Agent, or Firm* — Gibb & Riley, LLC; David A. Cain, Esq.

(57) ABSTRACT

Disclosed are methods for improving integrated circuit (IC) chip reliability. IC chips are manufactured and sorted into groups corresponding to process windows within a process distribution for the design. Group fail rates are set for each group based on failure mechanism fail rates, which are set for multiple failure mechanisms. An overall fail rate is determined for the full process distribution based on the group fail rates. First contribution amounts of the groups to the overall fail rate and second contribution amounts of the failure mechanisms to the group fail rate of each group are determined. Based on an analysis of the contribution amounts, at least one specific failure mechanism is selected and targeted for improvement (i.e., changes directed to the specific failure mechanism(s) are proposed and implemented). Optionally, proposed change(s) are only implemented if they will be sufficient to meet a reliability requirement and/or will not be cost-prohibitive.

20 Claims, 5 Drawing Sheets

(56) References Cited

U.S. PATENT DOCUMENTS

| | | | |
|---|---|---|---|
| 7,174,281 B2* | 2/2007 | Abercrombie | G06Q 10/043 700/108 |
| 7,340,359 B2* | 3/2008 | Erez | G01R 31/2894 700/109 |
| 7,434,195 B2* | 10/2008 | Hsu | G03F 1/144 382/144 |
| 7,695,876 B2* | 4/2010 | Ye | G03F 1/44 382/145 |
| 8,799,831 B2 | 8/2014 | Nehmadi et al. | |
| 8,943,444 B2 | 1/2015 | Bickford et al. | |
| 9,064,087 B2* | 6/2015 | Bickford | G06F 17/5009 |
| 9,354,953 B2* | 5/2016 | Bickford | G06F 11/008 |
| 9,489,482 B1* | 11/2016 | Bickford | G06F 17/5081 |
| 2002/0143483 A1 | 10/2002 | Ono et al. | |
| 2006/0217910 A1 | 9/2006 | Wang | |
| 2007/0156379 A1 | 7/2007 | Kulkarni et al. | |
| 2007/0212798 A1 | 9/2007 | Deshmukh et al. | |
| 2008/0114558 A1 | 5/2008 | Erez et al. | |
| 2008/0295047 A1 | 11/2008 | Nehmadi et al. | |
| 2011/0251812 A1 | 10/2011 | Gurov et al. | |
| 2012/0191384 A1 | 7/2012 | Kalgren et al. | |
| 2016/0019328 A1* | 1/2016 | Bickford | G06F 17/5036 703/14 |

FOREIGN PATENT DOCUMENTS

| | | |
|---|---|---|
| WO | 2006133233 A3 | 12/2006 |
| WO | 2007120279 A2 | 10/2007 |

OTHER PUBLICATIONS

Lee et al., "IC Performance Prediction for Test Cost Reduction", Semiconductor Manufacturing Conference Proceedings, IEEE,1999, pp. 111-114.

Turakhia et al., "Bridging DFM Analysis and Volume Diagnostics for Yield Learing—A Case Study", 27th IEEE VLSI Test Symposium, 2009, pp. 167-172.

* cited by examiner

FIG. 1

Groups (Corresponding To Process Windows Within The Process Distribution)

| Group Number | % of IC Chips |
|---|---|
| 15 | 0.298 |
| 14 | 0.789 |
| 13 | 1.817 |
| 12 | 3.641 |
| 11 | 6.349 |
| 10 | 9.633 |
| 9 | 12.720 |
| 8 | 14.617 |
| 7 | 14.617 |
| 6 | 12.720 |
| 5 | 9.633 |
| 4 | 6.349 |
| 3 | 3.641 |
| 2 | 1.817 |
| 1 | 0.789 |
| 0 | 0.298 |

INTEGRATED CIRCUIT CHIP RELIABILITY USING RELIABILITY-OPTIMIZED FAILURE MECHANISM TARGETING

BACKGROUND

The present invention relates to integrated circuit (IC) chip reliability and, more particularly, to a method for improving IC chip reliability using reliability-optimized failure mechanism targeting when selecting and implementing changes to processes in the manufacturing line.

More particularly, various failure mechanisms can cause the components (e.g., devices, interconnects, etc.) of an integrated circuit (IC) chip to degrade. These failure mechanisms include, but are not limited to, time-dependent dielectric breakdown (TDDB) of the gate dielectric layer or between metal lines, hot carrier injection (HCI), negative bias temperature instability (NBTI), positive bias temperature instability (PBTI), soft error rate (SER), retention disturbance, stress migration (SM) (also referred to as stress-induced voiding (SIV)) and electromigration (EM). Over time these failure mechanisms can impact performance (e.g., operating speed) and/or lead to IC chip failure.

Reliability of an IC chip (also referred to herein as the expected useful life of the IC chip) can be defined in terms of the expected minimum amount of time or, more particularly, the expected minimum number of power-on hours (POHs) during which an IC chip can be expected, with a specified probability, to perform without fail. Reliability is typically determined as a function of various failure mechanisms. Specifically, designers have realized that process parameter variations have a significant impact on IC chip performance (e.g., on operating speed, as indicated by delay). Such process parameter variations are due to variations that occur during manufacturing and include, but are not limited to, variations in channel length, channel width, doping, spacer width, etc. To determine reliability, reliability simulators model the various failure mechanisms in order to set the fail rates associated with those failure mechanisms across the full process distribution for the design. The full process distribution for the design refers to the performance range of IC chips manufactured according to the design, given a nominal operating voltage. This performance range extends from relatively fast IC chips (e.g., 3σ fast IC chips) at one end of the process distribution (i.e., the "fast" end of the process distribution) to relatively slow IC chips (e.g., 3σ slow IC chips) at the opposite end of the process distribution (i.e., the "slow" end of the process distribution). When improvements are subsequently made to the manufacturing line (i.e., to processes performed within the manufacturing line) with the goal of improving IC chip reliability, it is typically assumed that the impact of those improvements will be uniform across the full process distribution.

SUMMARY

In view of the foregoing, disclosed herein are methods for improving integrated circuit (IC) chip reliability. In the methods, IC chips can be manufactured according to a design and sorted into groups corresponding to different process windows within a process distribution for the design. Group fail rates can be set for each group based on failure mechanism fail rates, which are set for multiple different failure mechanisms. Then, an overall fail rate can be determined for the full process distribution based on the group fail rates. Subsequently, IC chip reliability across the process distribution can be improved using reliability-optimized failure mechanism targeting when selecting and implementing changes to processes in the manufacturing line. That is, first contribution amounts of the groups to the overall fail rate and second contribution amounts of the failure mechanisms to the group fail rate of each group can be determined. Based on an analysis of the first contribution amounts and the second contribution amounts, at least one specific failure mechanism can be selected and targeted for improvement (i.e., changes directed to the specific failure mechanism(s) selected can be proposed and implemented). Optionally, before any change(s) are implemented, a determination can be made as to whether or not the proposed change(s) will be sufficient to meet a reliability requirement and/or a determination can be made as to whether or not the proposed change(s) are cost-prohibitive.

In one method, IC chips can be manufactured according to a design and sorted into groups, which correspond to different process windows within a process distribution for the design. Group fail rates can be set for the groups, respectively. Each group fail rate for each group can be based on failure mechanism fail rates, which are set for multiple different failure mechanisms, respectively, as exhibited within the group. Then, an overall fail rate for the full process distribution (i.e., for all of the groups) can be determined based on the group fail rates.

Once the overall fail rate is determined, IC chip reliability and, particularly, the reliability of IC chips subsequently manufactured according to the design, can be improved using reliability-optimized failure mechanism targeting. Specifically, first contribution amounts of the groups to the overall fail rate can be determined. Then, for each group, second contribution amounts of the failure mechanisms to the group fail rate of that group can be determined. Based on an analysis of the first contribution amounts and the second contribution amounts, at least one specific failure mechanism can be selected and targeted for improvement. That is, the method can comprise proposing one or more changes to one or more processes to be performed during manufacturing of new IC chips according to the design, wherein the proposed change(s) are specifically directed toward improving the selected specific failure mechanism(s). The method can further comprise implementing the proposed change(s).

In other similar methods, the proposed change(s) can be implemented only when the proposed change(s) will be sufficient to meet a reliability requirement and, optionally, only when the proposed change(s) would not be cost-prohibitive. Specifically, as in the previously described method, IC chips can be manufactured according to a design and sorted into groups, which correspond to different process windows within a process distribution for the design. Group fail rates can be set for the groups, respectively. Each group fail rate for each group can be based on failure mechanism fail rates, which are set for multiple different failure mechanisms, respectively, as exhibited within that group. Then, an overall fail rate for the full process distribution (i.e., for all of the groups) can be determined based on the group fail rates.

Once the overall fail rate is determined, IC chip reliability and, particularly, the reliability of IC chips subsequently manufactured according to the design, can be improved using reliability-optimized failure mechanism targeting. Specifically, first contribution amounts of the groups to the overall fail rate can be determined. Then, for each group, second contribution amounts of the failure mechanisms to the group fail rate of that group can be determined. Based on an analysis of the first contribution amounts and the second contribution amounts, at least one specific failure mechanism can be selected and targeted for improvement. That is, the method can comprise proposing one or more changes to one or more processes to be performed during manufacturing of new IC chips according to the design, wherein the proposed change(s) are specifically directed toward improving the selected specific failure mechanism(s).

The method can further comprise determining expected fail rate change percentages for the different failure mechanisms, respectively, given the proposed change(s). Based on the expected fail rate change percentages for the different failure mechanisms, a predicted overall fail rate for the full process distribution can be determined. Once the predicted overall fail rate is determined, it can be compared to a predetermined fail rate threshold (i.e., a reliability requirement). When the predicted overall fail rate is higher than the predetermined fail rate threshold, the above-described processes can be iteratively repeated until such time as the predetermine fail rate threshold is met. That is, the method can comprise iteratively repeating the processes of selecting specific failure mechanism(s), proposing change(s), determining the expected fail rate change percentages, determining the predicted overall fail rate and comparing the predicted overall fail rate to the predetermined fail rate threshold until the predicted overall fail rate is lower than the predetermined fail rate threshold. When the predicted overall fail rate is lower than the predetermined fail rate threshold and, optionally, when the proposed change(s) do not exceed a predetermined cost threshold, the proposed change(s) can be implemented.

BRIEF DESCRIPTION OF THE SEVERAL VIEWS OF THE DRAWINGS

The present invention will be better understood from the following detailed description with reference to the drawings, which are not necessarily drawn to scale and in which.

DETAILED DESCRIPTION

As mentioned above, various failure mechanisms can cause the components (e.g., devices, interconnects, etc.) of an integrated circuit (IC) chip to degrade. These failure mechanisms include, but are not limited to, time-dependent dielectric breakdown (TDDB) of the gate dielectric layer or between metal lines, hot carrier injection (HCI), negative bias temperature instability (NBTI), positive bias temperature instability (PBTI), soft error rate (SER), retention disturbance, stress migration (SM) (also referred to as stress-induced voiding (SIV)) and electromigration (EM). Over time these failure mechanisms can impact performance (e.g., operating speed) and/or lead to IC chip failure.

Reliability of an IC chip (also referred to herein as the expected useful life of the IC chip) can be defined in terms of the expected minimum amount of time or, more particularly, the expected minimum number of power-on hours (POHs) during which an IC chip can be expected, with a specified probability, to perform without fail. Reliability is typically determined as a function of various failure mechanisms. Specifically, designers have realized that process parameter variations have a significant impact on IC chip performance (e.g., on operating speed, as indicated by delay). Such process parameter variations are due to variations that occur during manufacturing and include, but are not limited to, variations in channel length, channel width, doping, spacer width, etc. To determine reliability, reliability simulators model the various failure mechanisms in order to set the fail rates associated with those failure mechanisms across the full process distribution for the design. The full process distribution for the design refers to the performance range of IC chips manufactured according to the design, given a nominal operating voltage. This performance range extends from relatively fast IC chips (e.g., $3\sigma$ fast IC chips) at one end of the process distribution (i.e., the "fast" end of the process distribution) to relatively slow IC chips (e.g., $3\sigma$ slow IC chips) at the opposite end of the process distribution (i.e., the "slow" end of the process distribution). When improvements are subsequently made to the manufacturing line (i.e., to processes performed within the manufacturing line) with the goal of improving IC chip reliability, it is typically assumed that the impact of those improvements will be uniform across the full process distribution.

However, recently, it has been found that, depending upon the failure mechanism at issue, the failure mechanism fail rate may not be constant across the full process distribution (e.g., see U.S. Pat. No. 8,943,444 of Bickford et al., issued on Jan. 27, 2015 and incorporated herein by reference). That is, when a specific failure mechanism is modeled separately for different process windows within the full process distribution, the resulting fail rates may differ for the different process windows (e.g., the fail rate for a process window at the fast end of the process distribution may be higher or lower than the fail rate for a process window at the slow end of the process distribution). For example, the BTI and HCI failure mechanisms have a higher fail rate at the slow end of the process distribution, the TDDB and EM failure mechanisms have a higher fail rate at the fast end of the process distribution, and other failure mechanisms (e.g., stress-induced voiding (SIV)) have an essentially constant fail rate across the process distribution.

In view of the foregoing, disclosed herein are methods for improving integrated circuit (IC) chip reliability. In the methods, IC chips can be manufactured according to a design and sorted into groups corresponding to different process windows within a process distribution for the design. Group fail rates can be set for each group based on failure mechanism fail rates, which are set for multiple different failure mechanisms. Then, an overall fail rate can be determined for the full process distribution based on the group fail rates. Subsequently, IC chip reliability across the process distribution can be improved using reliability-optimized failure mechanism targeting when selecting and implementing changes to processes in the manufacturing line. That is, first contribution amounts of the groups to the overall fail rate and second contribution amounts of the failure mechanisms to the group fail rate of each group can be determined. Based on an analysis of the first contribution amounts and the second contribution amounts, at least one specific failure mechanism can be selected and targeted for improvement (i.e., changes directed to the specific failure mechanism(s) selected can be proposed and implemented). Optionally, before any change(s) are implemented, a determination can be made as to whether or not the proposed change(s) will be sufficient to meet a reliability requirement and/or a determination can be made as to whether or not the proposed change(s) will be cost-prohibitive.

Figure 1:
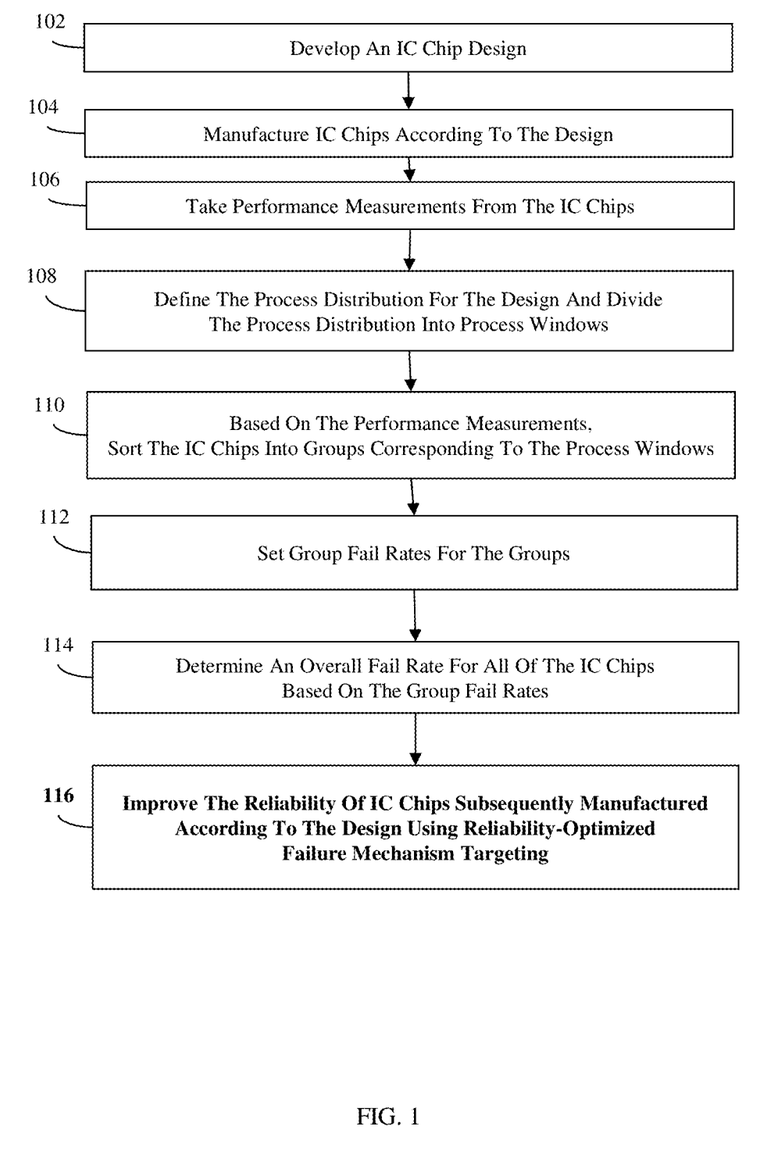
FIG. 1 is a flow diagram illustrating a method for improving integrated circuit (IC) chip reliability using reliability-optimized failure mechanism targeting when selecting and implementing changes to processes in the manufacturing line.

More particularly, referring to the flow diagram of FIG. 1, disclosed are methods for improving integrated circuit (IC) chip reliability using reliability-optimized failure mechanism targeting when selecting and implementing changes to processes in the manufacturing line.

In each of these methods, a design for an integrated circuit (IC) chip is developed (102) and a total number (N) of IC chips are manufactured according to that design (104). Those skilled in the art will recognize that the IC chip design developed at process 102 will set out specifications for various parameters (e.g., for channel length, channel width, doping, spacer width, etc.). However, the actual values of those parameters may vary due to manufacturing process variations and, as a result, may impact the performance (e.g., operating speed, as indicated by delay) of manufactured IC chips.

Following IC chip manufacture at process 104, various different measurements can be taken from the manufactured IC chips (106). These measurements can include, but are not limited to, performance measurements (e.g., delay measurements) and leakage power measurements. Various different techniques for measuring performance and leakage power of IC chips are well known in the art. Thus, the details of such techniques are omitted from this specification in order to allow the reader to focus on the salient aspects of the disclosed methods.

Additionally, the method can comprise defining the full process distribution of the IC chip design and dividing that process distribution into multiple process windows (108). That is, given the condition that all IC chips are operated using the same supply voltage, the full performance range (i.e., the full process distribution) of the IC chip design can be defined from the fastest IC chips (e.g., from 3-sigma fast IC chips) relative to IC chips with a nominal operating speed to the slowest IC chips (e.g., −3-sigma slow IC chips) relative to IC chips with the nominal operating speed. This process distribution can, for example, be a Gaussian distribution. Alternatively, the process distribution can be some other statistical distribution. In any case, the process distribution for the IC design can be defined either prior to manufacturing the IC chips at process 104 (e.g., based on a best case/worst case analysis) or after manufacturing the IC chips at process 104 (e.g., based on the actual performance measurements taken from the manufactured IC chips at process 106). In any case, the full process distribution can be divided into some number (M) of process windows.

Figure 2:
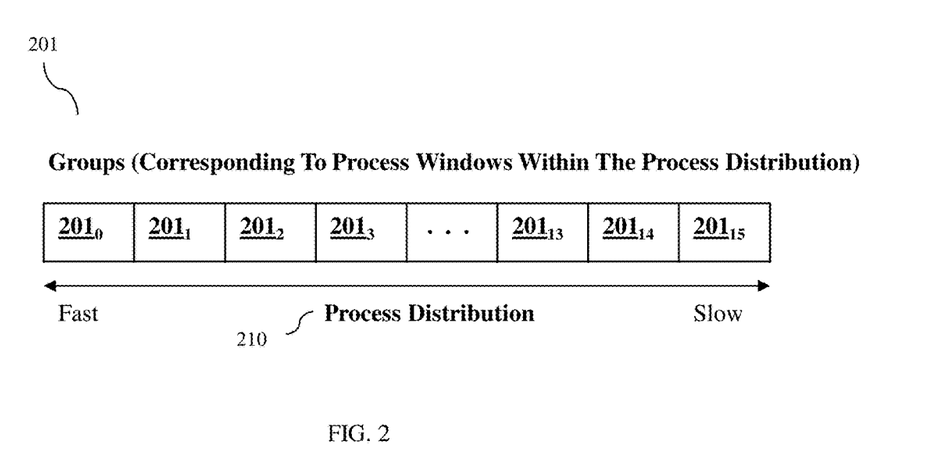
FIG. 2 is drawing illustrating sorting of IC chips into groups corresponding to process windows within a process distribution.

The manufactured IC chips can, based on the performance measurements acquired at process 106, be sorted into groups (e.g., M groups) that correspond to the various process windows within the full process distribution (110). Thus, each group will contain a subset of the total number (N) of IC chips manufactured at process 104. As illustrated in FIG. 2, the process distribution 210 can be divided at process 108 into process windows or, more particularly, successive intervals from the slow end of the process distribution to the fast end of the process distribution. The IC chips can be sorted into groups $201_0$-$201_{15}$ (also referred to herein as bins) at process 110 that correspond to those process windows. For illustration purposes, FIG. 2 shows that the IC chips can be sorted into sixteen groups $201_0$-$201_{15}$, which correspond to sixteen process windows (i.e., sixteen successive intervals across the process distribution 210), respectively. The first group $201_0$ corresponds to the process window with the fastest IC chips in the process distribution 210 and the last group $201_{15}$ corresponds to the process window with the slowest IC chips in the process distribution 210.

Figure 3A:
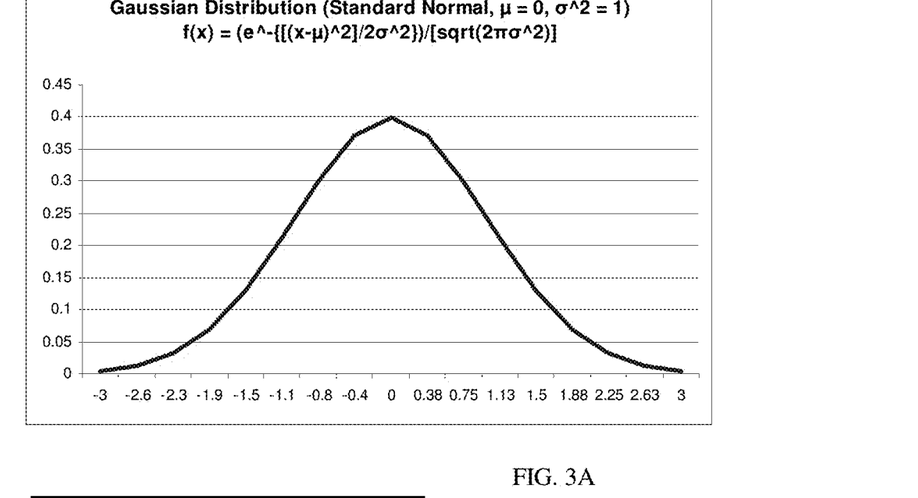
FIG. 3A is a graph illustrating an exemplary process distribution that is a Gaussian distribution.
Figure 3B:
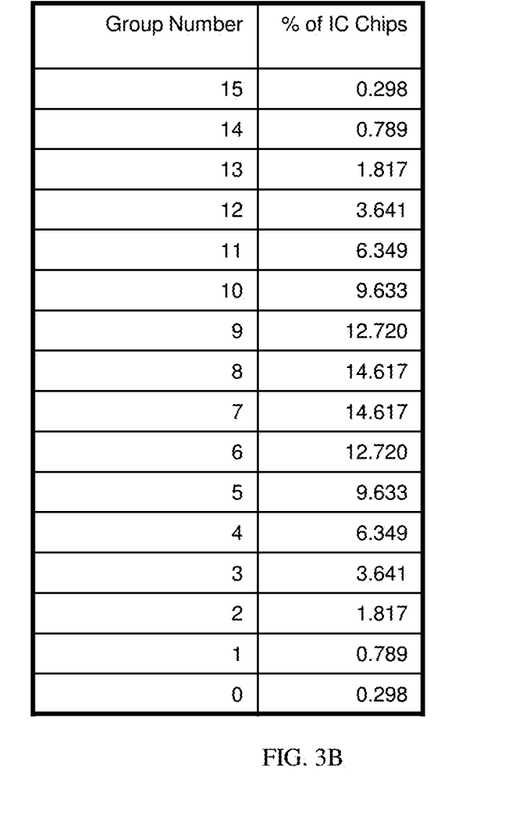
FIG. 3B is a table illustrating groups of IC chips and the percentages of the IC chips in each of the groups, when the process distribution is a Gaussian distribution as in FIG. 3A.

It should be understood that the percentages of the N manufactured IC chips that are sorted into each of the M groups (and, thereby the actual number (n) of IC chips in each of the groups, where the value of n may vary from group to group) will depend on the type of distribution, on the number (M) of process windows and on whether there is uniformity across the process windows (e.g., whether each process window encompasses the same number of units sigma). For example, for a process distribution 210 that is a Gaussian distribution as illustrated in the graph of FIG. 3A and that is sorted into sixteen different essentially uniform process windows (i.e., the process windows each encompass the same number of units sigma), the percentages of the N manufactured IC chips that are sorted into the sixteen different groups $201_0$-$201_{15}$ that correspond to the sixteen process windows, respectively, can be set as shown in the table of FIG. 3B. However, if the process distribution 210 is a statistical distribution other than a Gaussian distribution, the number of process windows (and thereby the number of groups) may differ and/or the number of units sigma per process window may differ from process window to process window such that these percentages may also differ.

Group fail rates can then be set for the groups $201_0$-$201_{15}$, respectively (112). Specifically, each group fail rate for each group can be set based the chip fail rates of the chips within that group. Each chip fail rate for each chip within a group can be set based on failure mechanism fail rates set for multiple different failure mechanisms, respectively, as exhibited on that chip. The different failure mechanisms can include, but are not limited to, time-dependent dielectric breakdown (TDDB) of the gate dielectric layer or between metal lines, hot carrier injection (HCI), negative bias temperature instability (NBTI), positive bias temperature instability (PBTI), soft error rate (SER), retention disturbance, stress migration (SM) (also referred to as stress-induced voiding (SIV)) and electromigration (EM). Those skilled in the art will recognize that a reliability simulator can be used to set the failure mechanism fail rates. That is, for each chip contained in a group, a reliability simulator can generate models of the different failure mechanisms at issue on the chip as a function of the specific process window, which is associated with that group.

Based on models generated by a reliability simulator, failure mechanism fail rates associated with different failure mechanisms on a particular chip within a particular group can be set. Then, the chip fail rate for that particular chip within that particular group, which corresponds to a particular process window, can be calculated using the following expression:

$$F_i = 1 - \pi_k (1 - f_k), \quad (1)$$

where $F_i$ represents the chip fail rate of one of the integrated circuit chips (i) in one of the groups (j) as a function of the a selected voltage, temperature and/or frequency for that group j, where $f_k$ represents one of the individual failure mechanism fail rates (i.e., the fail rate associated with a single one of the failure mechanisms (k) as a function of the selected voltage, temperature and/or frequency) and where $\pi_k (1 - f_k)$ represents the Cartesian product of $1 - f_k$ for all of the different failure mechanisms at issue (e.g., $(1-f_{TDDB})*(1-f_{HCI})*(1-f_{NBTI})* \ldots *(1-f_{SM})*(1-f_{EM})$). Equation (1) can further be used to find the chip fail rates for all of the IC chips in that particular group in the same manner as described above.

Once the chip fail rates for all of the IC chips in the particular group are acquired as described above, the group fail rate for that particular group can be determined using the following expression:

$$F_j = \frac{1}{n}\sum_i F_i, \qquad (2)$$

where $F_j$ represents the group fail rate of a group as a function of the selected voltage, temperature and/or frequency for that group j, n represents the number of IC chips within that group, and where $\Sigma_i F_i$ represents the sum of all the chip fail rates $F_i$ for all of the integrated circuit chips (i) within the group. Equations (1) and (2) can further be used to find the group fail rates for all of the groups that correspond to all of the process windows within the process distribution in the same manner as described above.

Once the group fail rates for all of the groups corresponding to all of the process windows in the process distribution are determined as described above, the overall fail rate for the process distribution can be calculated (114) using the following expression:

$$F_{PD} = \Sigma_j(p_j * F_j), \qquad (3)$$

where $F_{PD}$ represents the process distribution fail rate (i.e., the combined fail rate for all of the groups in the process distribution), where $p_j$ represents the percentage of the total number (N) of IC chips within a particular group and $p_j*F_j$ represents the contribution of the group fail rate of the particular group to the overall fail rate of the process distribution and where $\Sigma_j(p_j*F_j)$ is the sum of those contributions.

IC chip reliability and, particularly, the reliability of IC chips subsequently manufactured according to the design, can be improved using reliability-optimized failure mechanism targeting (116).

Figure 4:
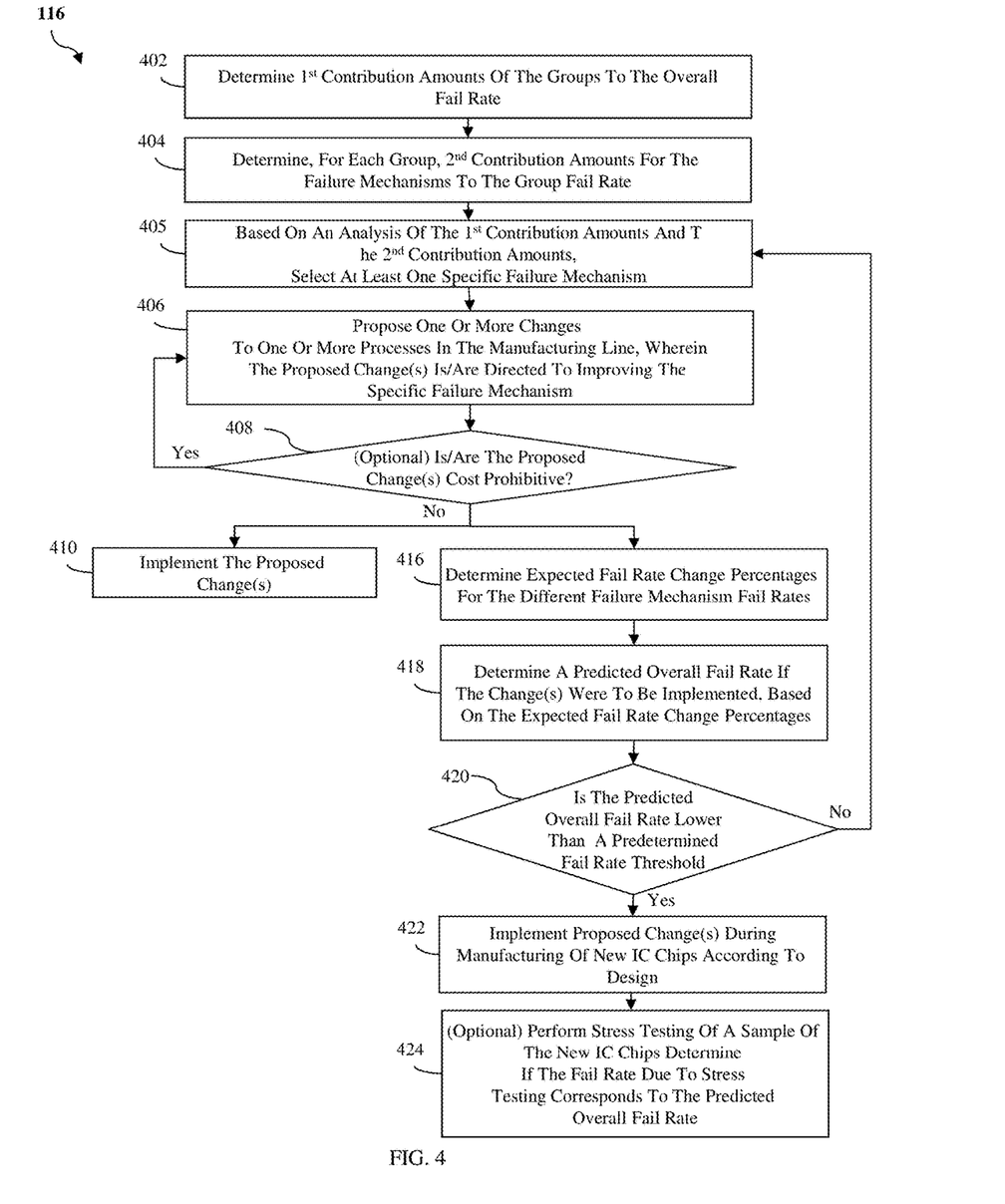
FIG. 4 is a flow diagram further illustrating process 116 of FIG. 1.

Specifically, as illustrated in greater detail in the flow diagram of FIG. 4, this process 116 of improving IC chip reliability using reliability-optimized failure mechanism targeting can comprise determining first contribution amounts of the groups, respectively, to the overall fail rate (402). The first contribution amount of each group to the overall fail rate can be calculated at process 402 as the value of the product of the percentage ($p_j$) of the total number (N) of the manufactured IC chips within a particular group and the group fail rate ($F_j$) of that particular group (see discussion of equation (3) above).

Additionally, for each particular group, second contribution amounts of the different failure mechanisms to the group fail rate of that particular group can be determined (404).

For each particular group, the second contribution amount of each failure mechanism to the group fail rate of that particular group can be determined at process 404 by accessing and using failure mechanism profiles for each of the groups, respectively. Such failure mechanism profiles can, for example, be previously crated during the process 112 described above wherein group fail rates are set for each of the groups, respectively. In any case, each failure mechanism profile for each particular group can quantify the second contribution amounts of the different failure mechanisms to the group fail rate of that particular group. Specifically, as mentioned above, to determine a group fail rate for a particular group using equation (2) above, the chip fail rates for all of the IC chips in that particular group must first be determined. The chip fail rate of a particular IC chip in the particular group can be determined, using equation (1), based on failure mechanism fail rates ($f_k$) associated with different failure mechanisms on the particular IC chip. Each second contribution amount of each particular failure mechanism to the group fail rate of the particular group can be calculated, for example, as the average fail rate for that particular failure mechanism for all of the IC chips in the particular group and stored in the failure mechanism profile for the group. Thus, the failure mechanism profile for each particular group will represent the second contribution amount for the TDDB failure mechanism to the group fail rate as the average TDDB fail rate for all the IC chips in the particular group, will represent the second contribution amount for the HCI failure mechanism to the group fail rate as the average HCI fail rate for all the IC chips in the particular group, will represent the second contribution amount for the NTBI failure mechanism to the group fail rate as the average NBTI fail rate for all the IC chips in the particular group, will represent the second contribution amount for the SER failure mechanism to the group fail rate as the average SER fail rate for all the IC chips in the particular group, will represent the second contribution amount for the SM failure mechanism to the group fail rate as the average SM fail rate for all the IC chips in the particular group, will represent the second contribution amount for the EM failure mechanism to the group fail rate as the average EM fail rate for all the IC chips in the particular group, and so on.

Based on an analysis of the first contribution amounts of the groups to the overall fail rate and of the second contribution amounts of the failure mechanisms to the group fail rate of each group, at least one specific failure mechanism can be selected and targeted for improvement (405). For example, the specific group that is the highest contributor to the overall fail rate can be identified. That is, the specific group that has the highest first contribution amount amongst all of the first contribution amounts of all the groups can be identified. Once the specific group that is the highest contributor to the overall fail rate is identified, the specific failure mechanism that is the highest contributor to the group fail rate of that specific group can be identified. That is, for the specific group identified as the highest contributor to the overall fail rate, the specific failure mechanism that has the highest second contribution amount amongst all the second contribution amounts of all the failure mechanisms associated with that specific group can be identified (e.g., by accessing the failure mechanism profile for that specific group and finding the failure mechanism with the highest average failure mechanism fail rate as listed in the profile). It should be understood that the above example describing a possible criteria for selecting the specific failure mechanism to target for improvement is not intended to be limiting. Alternatively, any other suitable selection criteria could be used for selecting the specific failure mechanism(s) to target for improvement at process 405. For example, if a specific failure mechanism is the highest contributor to the group fail rates of the majority of groups, but not necessarily the highest contributor to the group fail rate of the specific group that is the highest contributor to the overall fail rate, that specific failure mechanism could be selected at process 405. In another example, instead of selecting a single failure mechanism, the top two or more highest contributors to the group fail rate of the specific group that is the highest contributor to the overall fail rate could be targeted for improvement or two or more failure mechanisms can be selected that are not the highest contributors to the group fail rate of the specific group that is the highest contributor to the overall fail rate but that in combination contribute more to that group fail rate. In any case, once at least one specific failure mechanism is identified, the specific failure mechanism(s) can be targeted for improvement.

Next, the method can comprise proposing one or more changes to one or more processes in the manufacturing line, wherein the proposed change(s) are specifically directed toward improving the fail rate(s) associated with the specific failure mechanism(s) being targeted (i.e., to reducing the fail rate associated with that specific failure mechanism in the specific group, which corresponds to a specific process window within the process distribution) (406). For example, if a specific failure mechanism being targeted is time-dependent dielectric breakdown of a gate dielectric, then one or more proposed changes can be directed to the gate dielectric material and process being used and/or the gate dielectric thickness. If a specific failure mechanism being targeted is time-dependent dielectric breakdown of dielectric material between wires, then one or more proposed changes can be directed to the inter-/intra-layer dielectric material and process being used and/or the spacing between the wires. If a specific failure mechanism being targeted is hot carrier injection, then the one or more proposed changes can be directed to the gate dielectric material being used, the gate dielectric thickness, and/or the channel doping specifications (e.g., dopants, dopant concentration, etc.). If a specific failure mechanism being targeted is negative-bias temperature instability, then the one or more proposed changes can be directed to the temperature used during anneals and/or the gate dielectric thickness. If a specific failure mechanism being targeted is electromigration, then the one or more changes being proposed can be directed to the interconnect conductor material and process being used, the interconnect liner material being used, and/or the spacing between interconnects. It should be understood that the proposed changes mentioned above are not intended to be limiting. The proposed change(s) can comprise any proposed change to any process in the manufacturing line, as long as the proposed change(s) are directed to improving the specific failure mechanism(s) being targeted. Such changes can include, but are not limited to, changes in materials used, changes in concentrations of dopants used, changes in equipment used, changes in processing times and/or temperatures, etc.

Optionally, a determination can be made as to whether or not the proposed change(s) is/are cost prohibitive (408). That is, the costs associated with implementing the proposed change(s) can be determined and compared to some predetermined cost threshold. If the costs exceed the cost threshold, the above-described processes can be repeated with new change(s) being proposed. If the costs are not under consideration or if the costs are less than the predetermined cost threshold, the proposed change(s) can subsequently be implemented in the manufacturing line, during manufacturing of new IC chips according to the design (410). Alternatively, before implementing any proposed change(s), a determination can be made as to whether or not the proposed change(s) will be sufficient to meet a reliability requirement. If the proposed change(s) will not be sufficient to meet the reliability requirement, the above-described processes can be iteratively repeated until such time as change(s) are found that will be sufficient to meet the reliability requirement.

More specifically, once change(s) are proposed that target specific failure mechanism(s), then, given the proposed change(s), expected fail rate change percentages for the different failure mechanisms can be determined for each group (416). That is, the proposed change(s) can be evaluated with respect to each group to determine how much improvement (i.e., percentage decrease) should be expected in the failure mechanism fail rates ($f_k$) for each failure mechanism on each IC chip in each group in the event that such change(s) is/are implemented. For simplicity, the expected fail rate change percentage for a particular failure mechanism can be determined to be the same for all IC chips in the same group, but may or may not change from group to group. Thus, for example, it could be determined that, for a specific failure mechanism, the proposed change(s) could result in an expected fail rate change percentage of −5% (i.e., in a fail rate reduction of 5%) for IC chips in a group at the slow end of the process distribution and could result in an expected fail rate change percentage of −2% (i.e., a fail rate reduction of 2%) for IC chips in a different group at the fast end of the process distribution; whereas, for another failure mechanism, the proposed change(s) could result in an expected fail rate change percentage of −1% (i.e., a fail rate reduction of 1%) for all groups and, for yet another failure mechanism, the proposed change(s) could result in an expected fail rate change percentage of +1% (i.e., a fail rate increase of 1%) for all groups. Those skilled in the art will recognize such expected fail rate change percentages due to proposed change(s) in one or more processes in the manufacturing line can be determined based on prior knowledge of the impact of such proposed change(s).

Based on the expected fail rate change percentages for the different failure mechanisms for each group in the event that the proposed change(s) is/are implemented, a predicted overall fail rate for the full process distribution can be determined (418). Specifically, the values for the failure mechanism fail rates ($f_k$) in equation (1) can be adjusted for each IC chip in each particular group given the expected fail rate change percentages for the failure mechanisms for that particular group, as determined at process 416. Then, equation (1) can be solved to acquire the predicted fail rates for each of the IC chips in the particular group. Once the predicted chip fail rates for each of the IC chips in the particular group are acquired, equation (2) can be solved to acquire the predicted group fail rate of the particular group. Equations (1) and (2) can then be solved in the same manner as described above to also acquire the predicted group fail rates of all of the other groups. Once the predicted group fail rates for all of the groups that correspond to process windows in the process distribution are acquired, equation (3) can be solved to acquire the predicted overall fail rate.

Once the predicted overall fail rate is determined at process 418, it can be compared to a predetermined fail rate threshold (i.e., a reliability requirement) to determine whether or not that threshold would be met if the proposed change(s) were implemented (420). When the predicted overall fail rate is higher than the predetermined fail rate threshold, the above-described processes can be iteratively repeated until such time as change(s) are proposed that are sufficient to meet the predetermined fail rate threshold (i.e., until such time as the predicted overall fail rate is lower than the predetermined fail rate threshold). That is, when the predicted overall fail rate is above the predetermined fail rate threshold, the processes of selecting specific failure mechanism(s), proposing change(s), determining the expected change percentages, determining the predicted overall fail rate and comparing the predicted overall fail rate to the predetermined fail rate threshold can be iteratively repeated until the predicted overall fail rate is lower than the predetermined fail rate threshold. It should be noted that during such iterative processing the proposed change(s) can be adjusted, for example, by adding new proposed change(s) to the change(s) already proposed, by substituting proposed change(s), etc. In any case, when the predicted overall fail rate is lower than the predetermined fail rate threshold, the proposed change(s) (as adjusted by the above-described iterative processing) can be implemented the proposed change(s) can subsequently be implemented in the manufacturing line, during manufacturing of new IC chips according to the design (422).

Optionally, after the new IC chips are manufactured with the proposed change(s) implemented, stress testing can be performed on a sample of those new IC chips (424). Those skilled in the art will recognize that during stress testing the IC chips in the sample can be exercised. For example, the IC chips in the sample can be operated at an elevated temperature and/or at high voltage for a predefined period of time. Based on the results of this stress testing, a useful life prediction for the new IC chips can be made. Techniques for predicting the useful life of IC chips based on stress testing are well known in the art. Thus, the details of such techniques are omitted from this specification in order to allow the reader to focus on the salient aspects of the disclosed methods. In any case, if the useful life prediction meets and, particularly, is at or greater than a predetermined useful life specification for IC chips manufactured according to the design, the new IC chips can be shipped and/or incorporated into products. If the useful life prediction does not meet the predetermined useful life specification, the processes described above for improving IC chip reliability using reliability-optimized failure mechanism targeting when selecting and implementing changes to processes in the manufacturing line can be iteratively repeated.

The method as described above can be used in the fabrication of IC chips (e.g., IC chips the above-described programmable bits). The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Aspects of the disclosed methods (e.g., processes used when defining the process distribution, dividing the process distribution, setting group fail rates, determining the overall fail rate, proposing change(s) to process(es) in the manufacturing line, determining if those proposed change(s) will be sufficient, etc.) can be implemented using a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A representative hardware environment (i.e., a computer system) for implementing aspects of the methods, as described above, is depicted in FIG. 5. This schematic drawing illustrates a hardware configuration of an information handling/computer system in accordance with the embodiments herein. The system comprises at least one processor or central processing unit (CPU) 10. The CPUs 10 are interconnected via a system bus 12 to various devices such as a random access memory (RAM) 14, read-only memory (ROM) 16, and an input/output (I/O) adapter 18.

Figure 5:
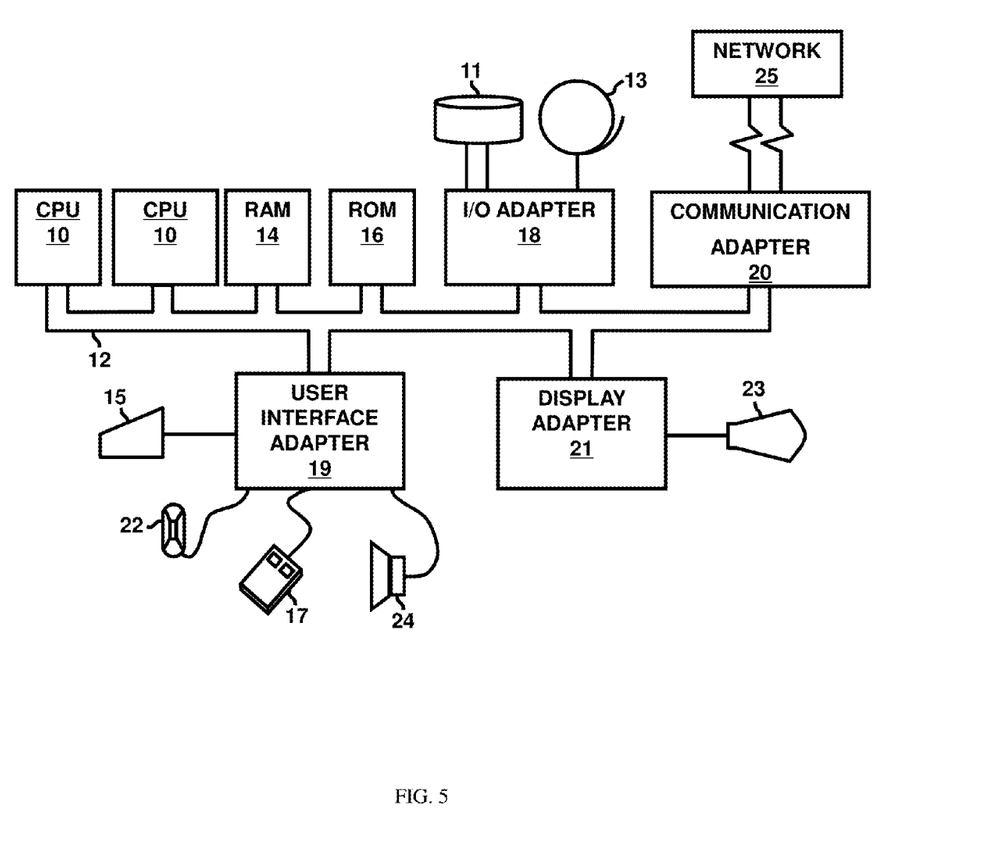
FIG. 5 is a schematic diagram illustrating an exemplary computer system for implementing aspects of the disclosed method.

The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the terminology used herein is for the purpose of describing the disclosed methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "on", "in direct contact", "abutting", "directly adjacent to", etc., are intended to indicate that at least one element physically contacts another element (without other elements separating the described elements). The corresponding structures, materials, acts, and equivalents of all means or step plus function elements in the claims below are intended to include any structure, material, or act for performing the function in combination with other claimed elements as specifically claimed.

Therefore, disclosed above are methods for improving integrated circuit (IC) chip reliability. In the methods, IC chips can be manufactured according to a design and sorted into groups corresponding to different process windows within a process distribution for the design. Group fail rates can be set for each group based on failure mechanism fail rates, which are set for multiple different failure mechanisms. Then, an overall fail rate can be determined for the full process distribution based on the group fail rates. Subsequently, IC chip reliability across the process distribution can be improved using reliability-optimized failure mechanism targeting when selecting and implementing changes to processes in the manufacturing line. That is, first contribution amounts of the groups to the overall fail rate and second contribution amounts of the failure mechanisms to the group fail rate of each group can be determined. Based on an analysis of the first contribution amounts and the second contribution amounts, at least one specific failure mechanism can be selected and targeted for improvement (i.e., changes directed to the specific failure mechanism(s) selected can be proposed and implemented). Optionally, before any change(s) are implemented, a determination can be made as to whether or not the proposed change(s) will be sufficient to meet a reliability requirement and/or a determination can be made as to whether or not the proposed change(s) will be cost-prohibitive.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
sorting, using a computer, integrated circuit chips manufactured according to a design into groups, said groups corresponding to different process windows within a process distribution for said design;
setting group fail rates for said groups, each group fail rate for each group being based on failure mechanism fail rates set for multiple failure mechanisms;
determining an overall fail rate based on said group fail rates; and,
improving integrated circuit chip reliability using reliability-optimized failure mechanism targeting, said improving comprising:
determining first contribution amounts of said groups to said overall fail rate;
determining, for each group fail rate of each group, second contribution amounts of said failure mechanisms to said group fail rate;
based on an analysis of said first contribution amounts and said second contribution amounts, selecting at least one specific failure mechanism; and
implementing at least one change to at least one process performed during manufacturing of new integrated circuit chips according to said design, said at least one change being directed toward improving said specific failure mechanism.

2. The method of claim 1, each first contribution amount for each group being a product of a fraction of a total number of said integrated circuit chips that were manufactured and that are in said group multiplied by a group fail rate for said group.

3. The method of claim 1, each second contribution amount for each failure mechanism in each group being an average failure mechanism fail rate for all integrated circuit chips in said group.

4. The method of claim 1, said selecting comprising:
identifying a specific group that is a highest contributor to said overall fail rate; and
identifying at least one specific failure mechanism that is a highest contributor to a specific group fail rate of said specific group.

5. The method of claim 1, further comprising, before said setting of said group fail rates, generating, for each integrated circuit chip in each group, models of said failure mechanisms as a function of a process window associated with said group.

6. The method of claim 1, further comprising performing stress testing of a sample of said new integrated circuit chips.

7. The method of claim 1, said specific failure mechanism comprising any of hot carrier injection (HCI), negative bias temperature instability (NBTI), positive bias temperature instability (PBTI), soft error rate (SER), retention disturbance, stress migration (SM) and electromigration (EM).

8. A method comprising:
sorting, using a computer, integrated circuit chips manufactured according to a design into groups, said groups corresponding to different process windows within a process distribution for said design;
setting group fail rates for said groups, each group fail rate for each group being based on failure mechanism fail rates set for multiple failure mechanisms;
determining an overall fail rate based on said group fail rates; and,
improving integrated circuit chip reliability using reliability-optimized failure mechanism targeting, said improving comprising:
determining first contribution amounts of said groups to said overall fail rate;
determining, for each group fail rate of each group, second contribution amounts of said failure mechanisms to said group fail rate;
based on an analysis of said first contribution amounts and said second contribution amounts, selecting at least one specific failure mechanism;
proposing at least one change to at least one process performed during manufacturing of new integrated circuit chips, said at least one change being directed toward improving said specific failure mechanism;
determining expected fail rate change percentages for said failure mechanisms given said at least one change;
based on said expected fail rate change percentages, determining a predicted overall fail rate;
comparing said predicted overall fail rate to a predetermined fail rate threshold;
when said predicted overall fail rate is higher than said predetermined fail rate threshold, iteratively repeating said proposing of said at least one change, said determining of said expected fail rate change percentages, said determining of said predicted overall fail rate and said comparing until said predicted overall fail rate is lower than said predetermined fail rate threshold; and
when said predicted overall fail rate is lower than said predetermined fail rate threshold, implementing any proposed changes.

9. The method of claim 8, each first contribution amount for each group being a product of a fraction of a total number of said integrated circuit chips that were manufactured and that are in said group multiplied by a group fail rate for said group.

10. The method of claim 8, each second contribution amount for each failure mechanism in each group being an average failure mechanism fail rate for all integrated circuit chips in said group.

11. The method of claim 8, said selecting comprising:
identifying a specific group that is a highest contributor to said overall fail rate; and
identifying at least one specific failure mechanism that is a highest contributor to a specific group fail rate of said specific group.

12. The method of claim 8, further comprising, before said setting of said group fail rates, generating, for each integrated circuit chip in each group, models of said failure mechanisms as a function a process window associated with said group.

13. The method of claim 8, further comprising performing stress testing of a sample of said new integrated circuit chips.

14. The method of claim 8, said specific failure mechanism comprising any of hot carrier injection (HCI), negative bias temperature instability (NBTI), positive bias temperature instability (PBTI), soft error rate (SER), retention disturbance, stress migration (SM) and electromigration (EM).

15. A method comprising:
sorting, using a computer, integrated circuit chips manufactured according to a design into groups, said groups corresponding to different process windows within a process distribution for said design;
setting group fail rates for said groups, each group fail rate for each group being based on failure mechanism fail rates set for multiple failure mechanisms;
determining an overall fail rate based on said group fail rates; and,
improving integrated circuit chip reliability using reliability-optimized failure mechanism targeting, said improving comprising:
determining first contribution amounts of said groups to said overall fail rate;
determining, for each group fail rate of each group, second contribution amounts of said failure mechanisms to said group fail rate;
based on an analysis of said first contribution amounts and said second contribution amounts, selecting at least one specific failure mechanism;
proposing at least one change to at least one process performed during manufacturing of new integrated circuit chips, said at least one change being directed toward improving said specific failure mechanism;
determining expected fail rate change percentages for said failure mechanisms given said at least one change;
based on said expected fail rate change percentages, determining a predicted overall fail rate;
comparing said predicted overall fail rate to a predetermined fail rate threshold;
when said predicted overall fail rate is higher than said predetermined fail rate threshold, iteratively repeating said proposing of said at least one change, said determining of said expected fail rate change percentages, said determining of said predicted overall fail rate and said comparing until said predicted overall fail rate is lower than said predetermined fail rate threshold; and
when said predicted overall fail rate is lower than said predetermined fail rate threshold and a cost of implementing any proposed changes is less than a predetermined cost threshold, implementing said proposed changes.

16. The method of claim 15, each first contribution amount for each group being a product of a fraction of a total number of said integrated circuit chips that were manufactured and that are in said group multiplied by a group fail rate for said group.

17. The method of claim 15, each second contribution amount for each failure mechanism in each group being an average failure mechanism fail rate for all integrated circuit chips in said group.

18. The method of claim 15, said selecting comprising:
identifying a specific group that is a highest contributor to said overall fail rate; and
identifying at least one specific failure mechanism that is a highest contributor to a specific group fail rate of said specific group.

19. The method of claim 15, further comprising performing stress testing of a sample of said new integrated circuit chips.

20. The method of claim 15, said specific failure mechanism comprising any of hot carrier injection (HCI), negative bias temperature instability (NBTI), positive bias temperature instability (PBTI), soft error rate (SER), retention disturbance, stress migration (SM) and electromigration (EM).

* * * * *